US009722232B2

(12) United States Patent
Kim et al.

(10) Patent No.: US 9,722,232 B2
(45) Date of Patent: *Aug. 1, 2017

(54) SECONDARY BATTERY

(71) Applicant: SAMSUNG SDI CO., LTD., Yongin-si, Gyeonggi-do (KR)

(72) Inventors: Jaemin Kim, Yongin-si (KR); Daeyon Moon, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/247,228

(22) Filed: Aug. 25, 2016

(65) Prior Publication Data

US 2016/0365563 A1  Dec. 15, 2016

Related U.S. Application Data

(62) Division of application No. 14/633,302, filed on Feb. 27, 2015, now Pat. No. 9,525,162.

(30) Foreign Application Priority Data

Nov. 3, 2014  (KR) ........................ 10-2014-0150839

(51) Int. Cl.
*H01M 2/26* (2006.01)
*H01M 10/48* (2006.01)
*H01M 2/22* (2006.01)
*H01M 2/06* (2006.01)

(52) U.S. Cl.
CPC .............. *H01M 2/26* (2013.01); *H01M 2/06* (2013.01); *H01M 2/22* (2013.01); *H01M 10/486* (2013.01); *H01M 2220/30* (2013.01)

(58) Field of Classification Search
CPC .......... H01M 2/348; H01M 2/26; H01M 2/22; H01M 10/486; H01M 10/48
See application file for complete search history.

(56) References Cited

U.S. PATENT DOCUMENTS

| 2010/0136423 A1 | 6/2010 | Seo et al. |
| 2012/0160552 A1 | 6/2012 | Jang et al. |
| 2012/0276420 A1 | 11/2012 | Baek et al. |

(Continued)

FOREIGN PATENT DOCUMENTS

| JP | 08-203494 A | 8/1996 |
| JP | 2010-027546 A | 2/2010 |

(Continued)

OTHER PUBLICATIONS

Korean Office Action dated Dec. 3, 2015 in Corresponding Korean Patent Application No. 10-2014-0150839.

(Continued)

*Primary Examiner* — Mark F Huff
*Assistant Examiner* — Monique Wills
(74) *Attorney, Agent, or Firm* — Lee & Morse, P.C.

(57) ABSTRACT

A secondary battery, including an electrode assembly; a cap plate that seals the electrode assembly; an electrode pin electrically connected to the electrode assembly and on the cap plate with an insulating gasket therebetween; and a first lead tab coupled to the electrode pin, a relative ratio W2/W1 of a width W2 of the insulating gasket to a width W1 of the first lead tab satisfying $1.0 < W2/W1 < 1.14$.

10 Claims, 6 Drawing Sheets

(56) References Cited

U.S. PATENT DOCUMENTS

2013/0234721 A1\* 9/2013 Nakamura ............ H01M 2/105
  324/434
2015/0364745 A1\* 12/2015 Wang .................... H01M 2/348
  429/7

FOREIGN PATENT DOCUMENTS

| JP | 2011-187461 A | 9/2011 |
| KR | 10-2010-0063377 A | 6/2010 |
| KR | 10-2010-0121336 A | 11/2010 |

OTHER PUBLICATIONS

Korean Registration Determination dated Jun. 23, 2016, in Corresponding Korean Patent Application No. 10-2014-0150839.

\* cited by examiner

SECONDARY BATTERY

CROSS-REFERENCE TO RELATED APPLICATIONS

This is a divisional application based on pending application Ser. No. 14/633,302, filed Feb. 27, 2015, the entire contents of which is hereby incorporated by reference.

Korean Patent Application No. 10-2014-0150839, filed on Nov. 3, 2014, in the Korean Intellectual Property Office, and entitled: "Secondary Battery," is incorporated by reference herein in its entirety.

BACKGROUND

1. Field

One or more exemplary embodiments relate to a secondary battery.

2. Description of the Related Art

Along with the development of the wireless Internet and communication technology, use of electronic devices, such as mobile phones or portable computers, which may operate by using batteries, and without being connected to a fixed power supply device, has become ubiquitous. Such electronic devices may include a secondary battery or a plurality of secondary batteries.

SUMMARY

Embodiments may be realized by providing a secondary battery, including an electrode assembly; a cap plate that seals the electrode assembly; an electrode pin electrically connected to the electrode assembly and on the cap plate with an insulating gasket therebetween; and a first lead tab coupled to the electrode pin, a relative ratio $W_2/W_1$ of a width $W_2$ of the insulating gasket to a width $W_1$ of the first lead tab satisfying $1.0 < W_2/W_1 < 1.14$.

The first lead tab may include an upper section coupled to the electrode pin and a lower section extending downward from the upper section toward the cap plate in a stepwise manner.

The upper section may extend beyond the insulating gasket.

An extension length L from the insulating gasket to an end of the upper section may satisfy $0.50$ mm $< L < 1.00$ mm.

The end of the upper section may correspond to an inflection point where the upper section begins to be bent toward the lower section.

The lower section may be electrically connected to a temperature sensor.

The lower section and the temperature sensor may be in area-contact with a support surface.

The support surface may be a top surface of an insulating member attached to the cap plate.

The temperature sensor may include a first lead spaced apart from the support surface, and the lower section may be between the first lead and the support surface.

The temperature sensor may include a second lead opposite the first lead and spaced apart from the support surface, and a second lead tab may be between the second lead and the support surface.

The temperature sensor and the second lead tab may be in area-contact with the support surface.

The support surface may be a top surface of an insulating member attached to the cap plate.

Embodiments may be realized by providing a secondary battery, including an electrode assembly; a cap plate that seals the electrode assembly; an electrode pin electrically connected to the electrode assembly and on the cap plate with an insulating gasket therebetween; and a first lead tab coupled to the electrode pin, the first lead tab including an upper section coupled to the electrode pin and a lower section extending downward from the upper section toward the cap plate in a stepwise manner, the upper section extending beyond the insulating gasket, an extension length L from the insulating gasket to an end of the upper section satisfying $0.50$ mm $< L < 1.00$ mm.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
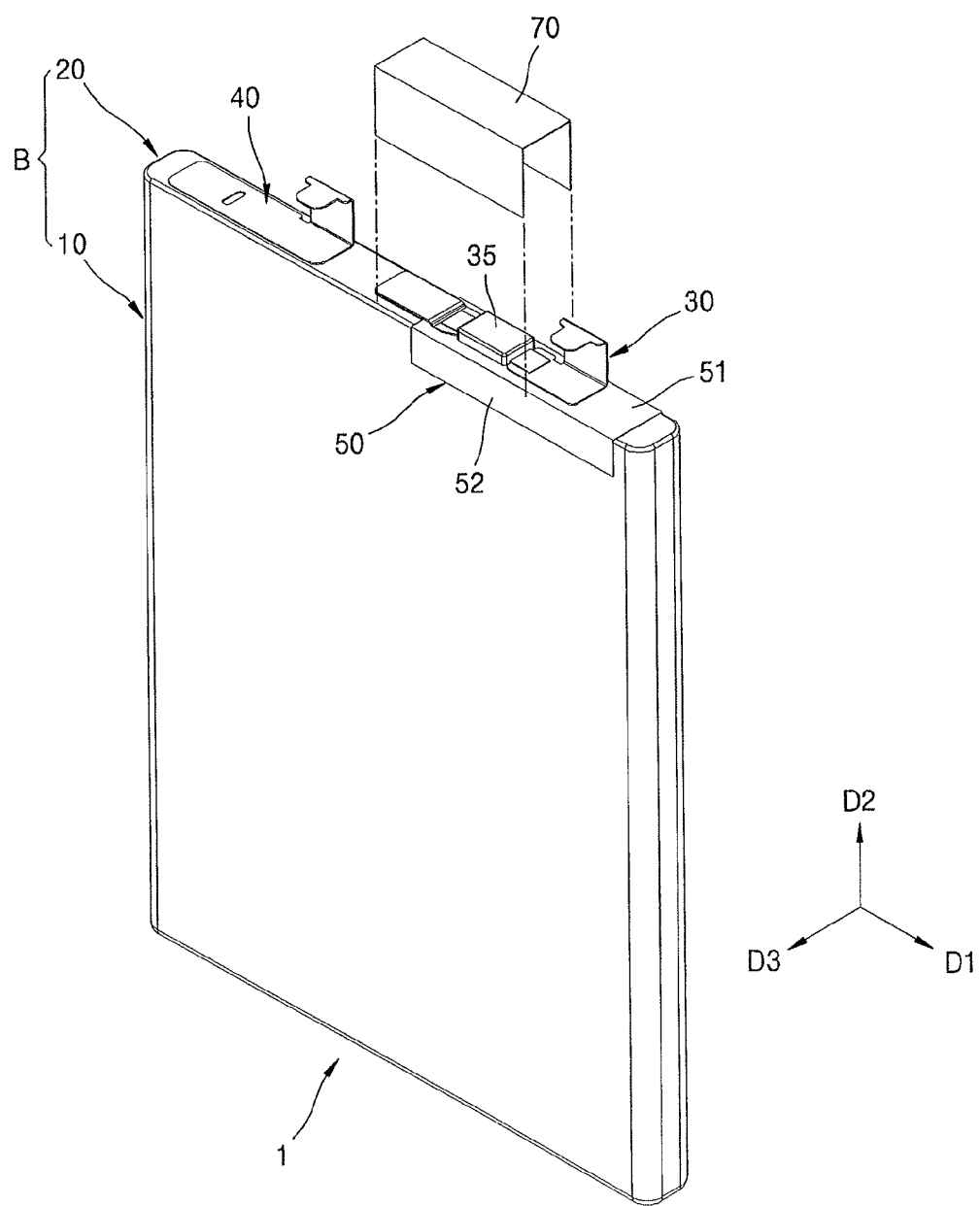
FIG. 1 illustrates a perspective view of a secondary battery according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawings, the same elements are denoted by the same reference numerals, and a repeated explanation thereof will not be given.

As used herein, the singular forms "a," "an," and "the" are intended to include the plural forms as well, unless the context clearly indicates otherwise.

It will be further understood that the terms "comprises" and/or "comprising" used herein specify the presence of stated features or components, but do not preclude the presence or addition of one or more other features or components.

It will be understood that when a layer, region, or element is referred to as being "formed on," another layer, region, or element, it can be directly or indirectly formed on the other layer, region, or element. That is, for example, intervening layers, regions, or elements may be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present.

Sizes of elements may be exaggerated for convenience of explanation. In other words, since sizes and thicknesses of elements in the drawings are arbitrarily illustrated for convenience of explanation, the following exemplary embodiments are not limited thereto.

As used herein, the term "and/or" includes any and all combinations of one or more of the associated listed items. Expressions such as "at least one of," when preceding a list of elements, modify the entire list of elements and do not modify the individual elements of the list.

Figure 2:
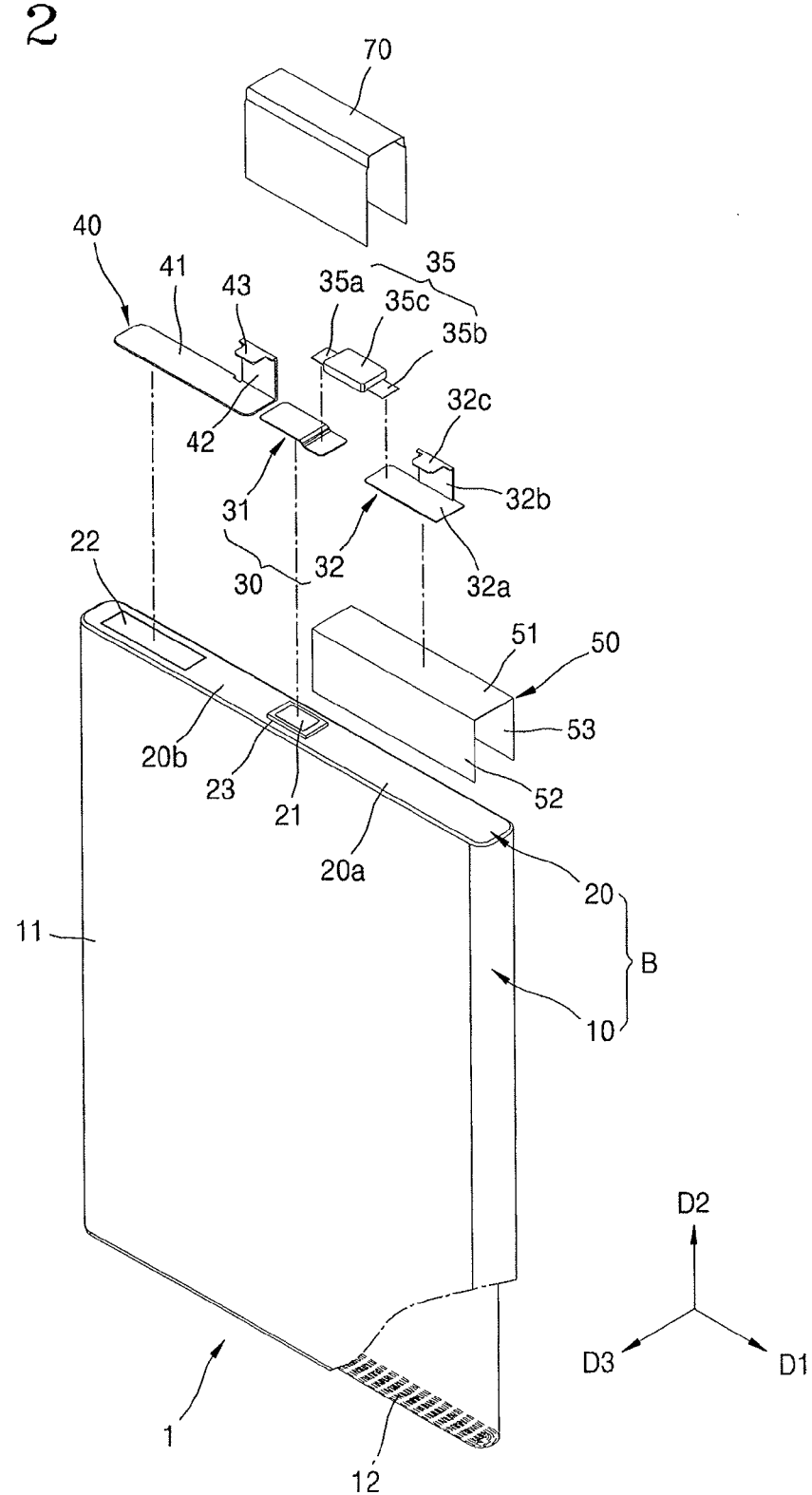
FIG. 2 illustrates an exploded perspective view of FIG. 1, according to an exemplary embodiment.

FIG. 1 illustrates a perspective view of a secondary battery according to an exemplary embodiment. FIG. 2 illustrates an exploded perspective view of a case where a protective circuit module is coupled to the secondary battery of FIG. 1, according to an exemplary embodiment. For better understanding, a can 10 is partially opened to expose an electrode assembly 12 in FIG. 2. Referring to FIGS. 1 and 2, the secondary battery according to an exemplary embodiment may include a bare cell B, a first terminal 30, a second terminal 40, an insulating member 50, and a fixing member 70.

The bare cell B may be a rechargeable secondary battery. For example, the bare cell B may be a lithium-ion battery. The bare cell B may have a substantially hexahedral shape and may include a can 10 that has an opening, an electrode assembly 12 that is received in the can 10 through the opening, a cap plate 20 that seals the opening of the can 10, and an electrode pin 21 that is formed on the cap plate 20.

The can 10 may have a substantially hexahedral shape with an open side surface, may be formed of a metallic material, and may have a suitable strength. For example, the can 10 may be formed of aluminum or an aluminum alloy. After the electrode assembly 12 is inserted through the opening into the can 10, the opening may be sealed by the cap plate 20. The cap plate 20 may be formed of a metallic material such as aluminum or an aluminum alloy, like the can 10. The cap plate 20 and the can 10 may be hermetically coupled to each other, e.g., using laser welding.

The electrode assembly 12 may include a first electrode plate and a second electrode plate and a separator disposed between the first electrode plate and the second electrode plate. An electrode active material may be applied to each of a first electrode plate and a second electrode plate. The first electrode plate and the second electrode plate may have different polarities. The electrode assembly 12 may be manufactured by sequentially stacking the first electrode plate, the separator, and the second electrode plate and then rolling the formed stack into a jelly roll shape.

In an embodiment, the electrode assembly 12 may have a structure in which the first electrode plate, the separator, and the second electrode plate are simply sequentially stacked without being rolled into a jelly roll shape.

The electrode pin 21 may be formed on the cap plate 20 to protrude from the cap plate 20.

The first electrode plate may be electrically connected to the electrode pin 21, and the second electrode plate may be electrically connected to the cap plate 20. The first electrode plate and the second electrode plate may have different polarities, and the electrode pin 21 and the cap plate 20 may also have different polarities. For example, the electrode pin 21 may have a negative polarity, whereas the cap plate 20 may have a positive polarity. An insulating gasket 23 may be provided between the electrode pin 21 and the cap plate 20, and a short-circuit may be prevented between the electrode pin 21 and the cap plate 20.

Figure 3:
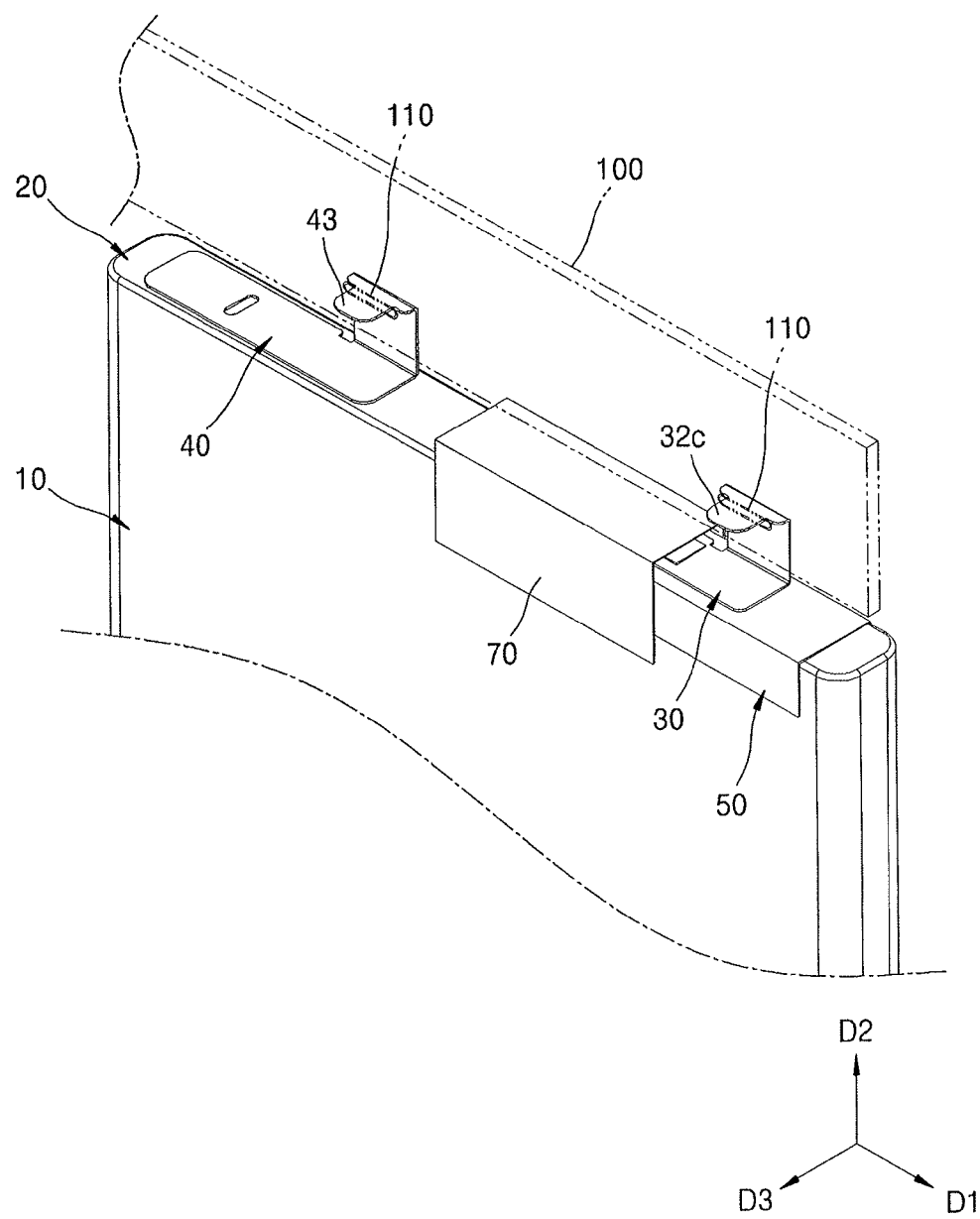
FIG. 3 illustrates a perspective view of a case where a protective circuit module is coupled to the secondary battery, according to an exemplary embodiment.

The first terminal 30 and the second terminal 40 may be disposed on a first surface of the bare cell B, for example, on the cap plate 20, and may electrically connect the secondary battery to the protective circuit module. For example, as shown in FIG. 3, the secondary battery may be electrically connected to the protective circuit module by inserting end portions 32c and 43 of the first and second terminals 30 and 40 into holes 110 formed in a circuit board 100 of the protective circuit module and performing welding.

Referring back to FIGS. 1 and 2, the first terminal 30 may be disposed on a first portion 20a of the cap plate 20 and the second terminal 40 may be disposed on a second portion 20b of the cap plate 20. According to an exemplary embodiment, the first terminal 30 and the second terminal 40 may be disposed at opposite sides of the electrode pin 21.

The first terminal 30 may be disposed on the cap plate 20 and may be electrically connected to the electrode pin 21, and the second terminal 40 may be welded to directly contact the second portion 20b of the cap plate 20 and may be electrically connected to the cap plate 20.

The first terminal 30 may include a first lead tab 31 that is connected to the electrode pin 21, a second lead tab 32 that is spaced apart from the first lead tab 31 in a longitudinal direction of the cap plate 20, and a temperature sensor 35 that is disposed between the first and second lead tabs 31 and 32. A first lead 35a and a second lead 35b may be respectively formed on both ends of a main body 35c of the temperature sensor 35, and may be respectively directly welded to the first lead tab 31 and the second lead tab 32. The second lead tab 32 may include a first portion 32a that is parallel to the cap plate 20, a second portion 32b that is bent from the first portion 32a, and a third portion 32c that is bent from the second portion 32b and is substantially parallel to the first portion 32a.

The second terminal 40 may include a first portion 41 that is parallel to the cap plate 20, a second portion 42 that is bent from the first portion 41, and a third portion 43 that is bent from the second portion 42 and is substantially parallel to the first portion 41.

The second terminal 40 and the cap plate 20 may be formed of different materials. For example, the cap plate 20 may be formed of aluminum or an aluminum alloy, and the second terminal 40 may be formed of nickel. A coupling section 22 may be further provided on the cap plate 20, and the weldability between the second terminal 40 and the cap plate 20 formed of different materials may be improved. The coupling section 22 may be formed of a material that is different from that of the cap plate 20, for example, the same material as that of the second terminal 40.

The first terminal 30 may be electrically connected to the electrode pin 21 and the second terminal 40 may be electrically connected to the cap plate 20, and the first and second terminals 30 and 40 may have different polarities. For example, the first terminal 30 may have a negative polarity and the second terminal 40 may have a positive polarity.

The second terminal 40 on the cap plate 20 may have the same polarity as that of the cap plate 20, and no short-circuit may occur between the second terminal 40 and the cap plate 20. However, the first terminal 30 on the cap plate 20 may have a polarity that is different from that of the cap plate 20, and a short-circuit may occur between the first terminal 30 and the cap plate 20. The insulating member 50 may be disposed between the first terminal 30 and the cap plate 20 to prevent such a short-circuit.

The insulating member 50 may be attached to outer surfaces of the bare cell B and may prevent a short-circuit between the first terminal 30 and the outer surfaces of the bare cell B.

The cap plate 20 may be coupled to the can 10, e.g., by welding, as described above. The can 10 may be formed of a metal having conductivity like the cap plate 20, and the can 10 may have the same polarity as that of the cap plate 20.

The first terminal 30 and the outer surfaces of the bare cell B excluding the electrode pin 21 may have different polarities, the insulating member 50 may have a large surface, and a short-circuit between the first terminal 30 and the cap plate 20 and a short-circuit between the first terminal 30 and an outer surface of the can 10 may be prevented.

The insulating member 50 may partially cover three outer surfaces of the bare cell B. For example, the first insulating member 50 may include a first portion 51 that covers the first portion 20a of the cap plate 20, which is a first surface of the bare cell B, a second portion 52 that is substantially perpendicular to the first portion 51 and partially covers a second surface 11 of the bare cell B, and a third portion 53 that is substantially perpendicular to the first portion 51 and partially covers a third surface of the bare cell B. Surfaces of the insulating member 50 which face the bare cell B may have an adhesive force and may be attached to the outer surfaces of the bare cell B.

For example, the insulating member 50 may be a thin polyethyleneterephthalate (PET) film.

The fixing member 70 may cover the first terminal 30, to prevent the first terminal 30 from being separated or detached from the bare cell B. The first terminal 30 may be coupled to the bare cell B, as the first lead tab 31 may be directly welded to the electrode pin 21. Only one end portion of the first terminal 30, for example, the first lead tab 31, may be welded to the electrode pin 21, and the second lead tab 32 that is the other end portion of the first terminal 30 may not be fixed. The first terminal 30 may be separated from the bare cell B or a short-circuit may occur between the first terminal 30 and the outer surfaces of the bare cell B when the first terminal 30 moves.

The fixing member 70 may be disposed to cover the first terminal 30, to prevent such a separation or short-circuit. The fixing member 70 may have a shape similar to that of the first insulating member 50. For example, the fixing member 70 may include a portion that covers the first terminal 30 and both end portions that are bent in a direction perpendicular to the portion that covers the first terminal 30. The fixing member 70 may be a plastic injection product or an adhesive tape. When the fixing member 70 is an adhesive tape, an increase in a thickness of the secondary battery may be reduced.

Figure 4:
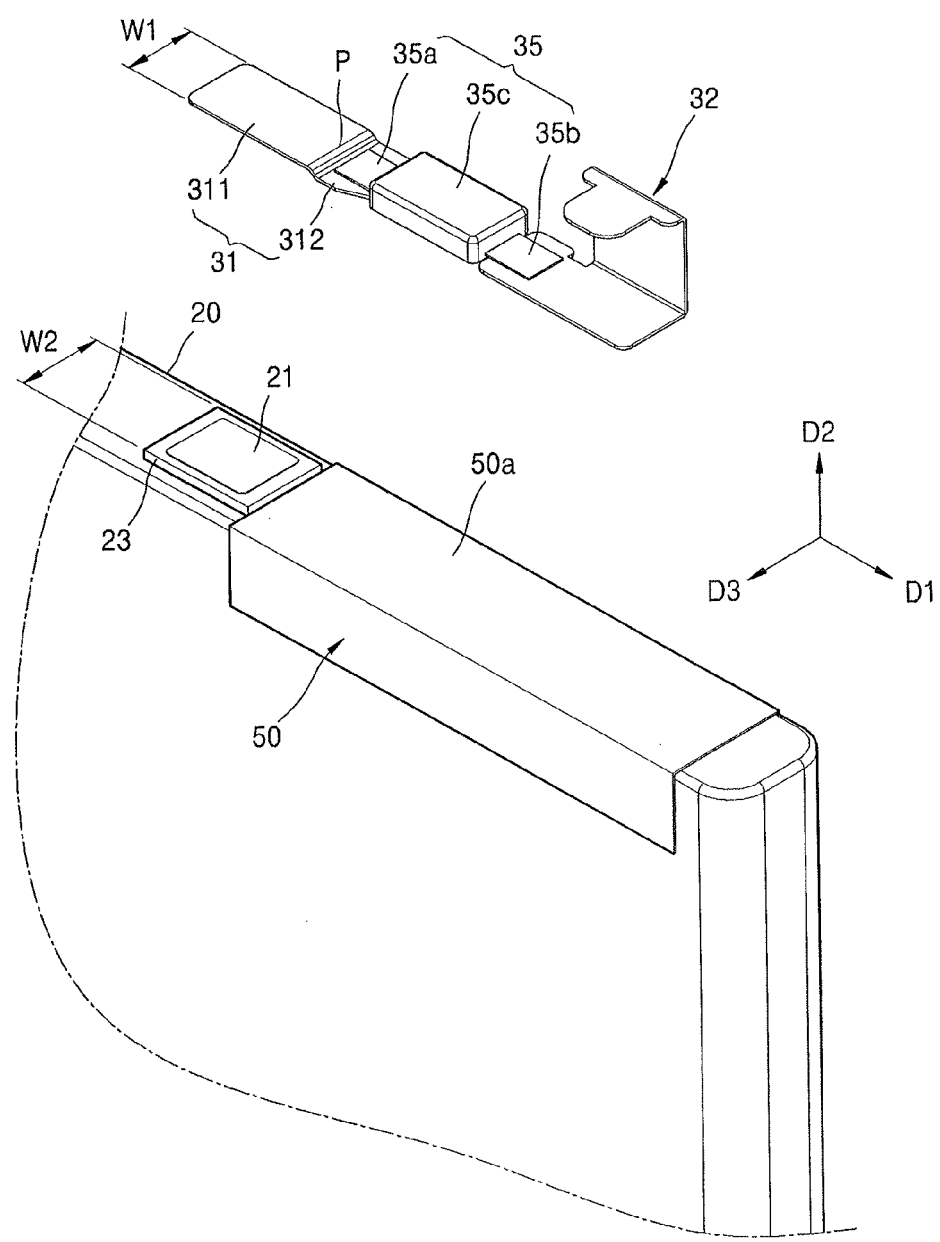
FIG. 4 illustrates a perspective view of some elements of FIG. 2, according to an exemplary embodiment.
Figure 5:
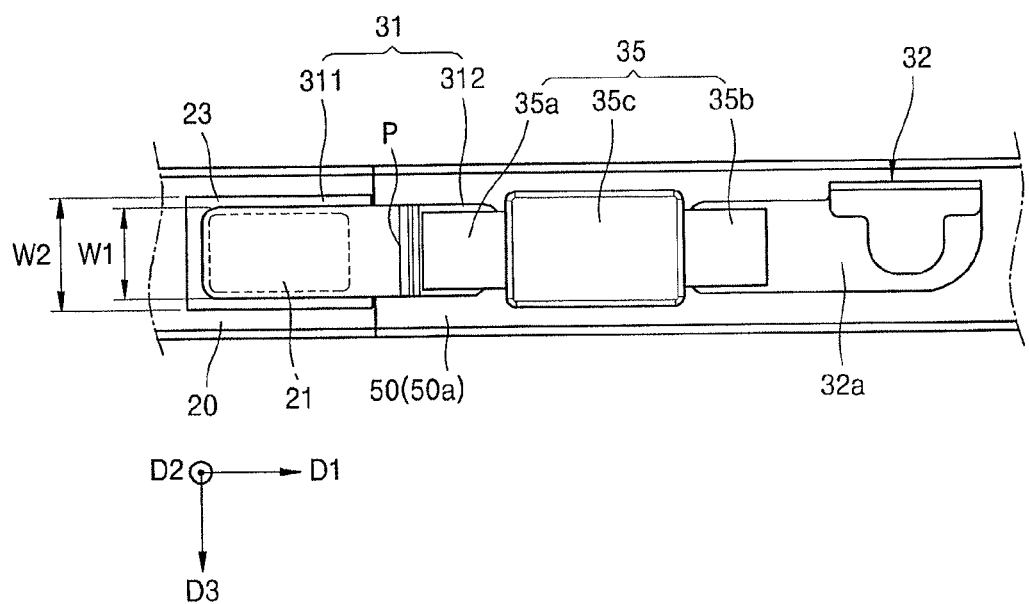
FIGS. 5 and 6 illustrate respectively a top view and a side view of elements of FIG. 4, according exemplary embodiments.
Figure 6:
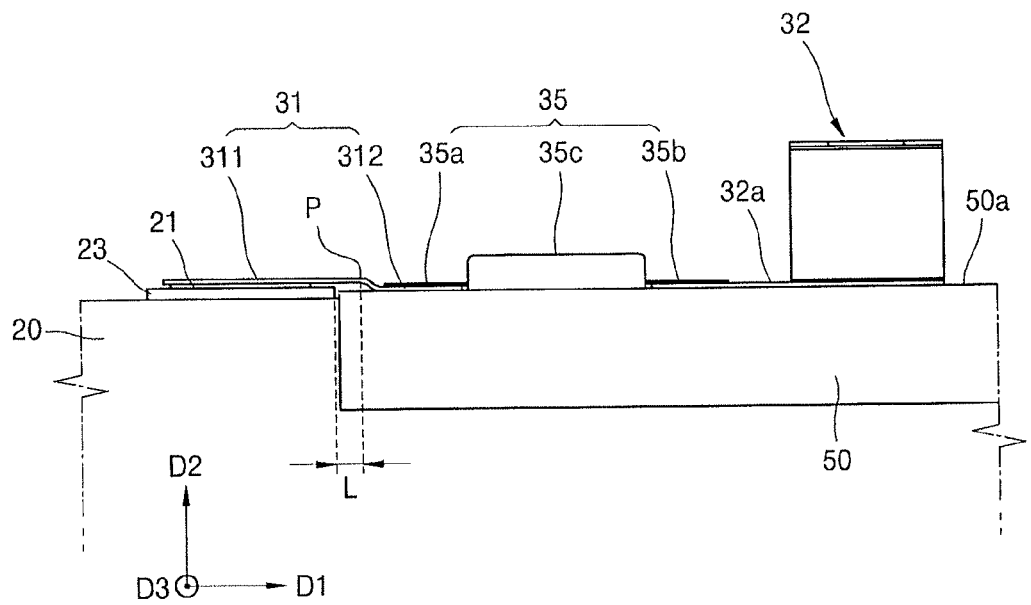

FIG. 4 illustrates a perspective view of some elements of FIG. 2, according to an exemplary embodiment. FIGS. 5 and 6 illustrate respectively a top view and a side view of elements of FIG. 4, according to exemplary embodiments. Referring to FIGS. 4 through 6, the secondary battery may include the electrode assembly 12 (see FIG. 2), the cap plate 20 that seals the electrode assembly 12, the electrode pin 21 that is electrically connected to the electrode assembly 12 and is assembled on the cap plate 20 with the insulating gasket 23 therebetween, and the first lead tab 31 that is coupled to the electrode pin 21.

According to an exemplary embodiment, the electrode pin 21 may be assembled on the cap plate 20 to pass through the cap plate 20, the insulating gasket 23 may be disposed between the electrode pin 21 and the cap plate 20, and the electrode pin 21 and the cap plate 20 having different polarities may be insulated. The first lead tab 31 may be welded to the electrode pin 21.

Widths of the first lead tab 31 and the insulating gasket 23 may respectively be W1 and W2, and a relative ratio W2/W1 of the width W2 of the insulating gasket 23 to the width W1 of the first lead tab 31 may within a predetermined range as follows.

Figure 7:
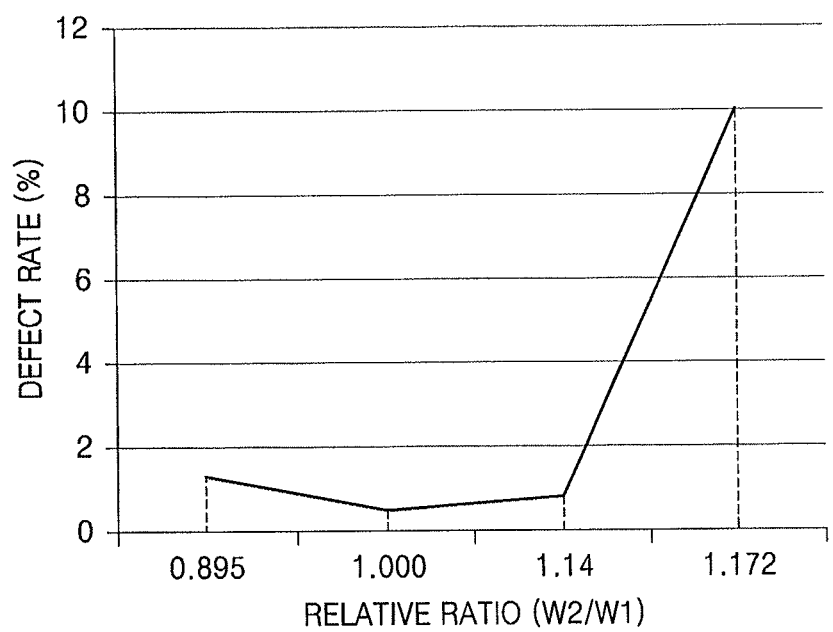
FIG. 7 illustrates a graph of a relationship between a defect rate and a relative ratio, according to an exemplary embodiment.

FIG. 7 illustrates a graph of a relationship between a defect rate and the relative ratio W2/W1, according to an exemplary embodiment. Referring to FIG. 7, the relative ratio W2/W1 may satisfy 1.00<W2/W1<1.14. For example, when the relative ratio W2/W1 is less than 1.00 or greater than the 1.14, the defect rate may increase.

Regarding the lower limit of 1.00, when the width W2 of the insulating gasket 23 is less than or equal to the width W1 of the first lead tab 31, while the first lead tab 31 is welded, an electrical short-circuit may occur between the first lead tab 31 and the cap plate 20, for example, due to sparks generated during welding, and the defect rate may increase when W2/W1<1.00, as shown in FIG. 7. Sparks generated during welding may cause a soft short-circuit between the first lead tab 31 and the cap plate 20. Thus, according to embodiments, the width W2 of the insulating gasket 23 may be greater than the width W1 of the first lead tab 31 (the relative ratio W2/W1>1.00).

Regarding the upper limit of 1.14, when the width W1 of the first lead tab 31 is much less than the width W2 of the insulating gasket 23, for example, when the relative ratio W2/W1 is greater than or equal to 1.14, a welding area of the first lead tab 31 may be limited, which may lead to weak welding. Welding heat input may concentrate on the limited welding area and a bead may be broken up, the defect rate may increase. When the welding area of the first lead tab 31 is limited, a welding rod may be pushed into the insulating gasket 23 beyond the first lead tab 31, and the defect rate may be increased.

Thus, according to embodiments, the width W2 of the insulating gasket 23 may be greater than the width W1 of the first lead tab 31 (the relative ratio W2/W1>1.00) and the relative ratio W2/W1 may be less than a predetermined ratio (the relative ratio W2/W1<1.14).

The first lead tab 31 may include an upper section 311 that is coupled to the electrode pin 21 and a lower section 312 that extends downward from the upper section 311 toward the cap plate 20 in a stepwise manner. The upper section 311 and the lower section 312 may extend to be parallel to the cap plate 20 at upper position and lower position respectively along direction D2. An inflection point P where the upper section 311 begins to be bent toward the lower section 312 may be formed at an end of the upper section 311.

Referring again to FIG. 6, the upper section 311 that is coupled to the electrode pin 21 may further extend beyond the insulating gasket 23. A length from the insulating gasket 23 to the end of the upper section 311 where the inflection point P is formed may be an extension length L, and the extension length L of the upper section 311 may be within a predetermined range as follows.

Figure 8:
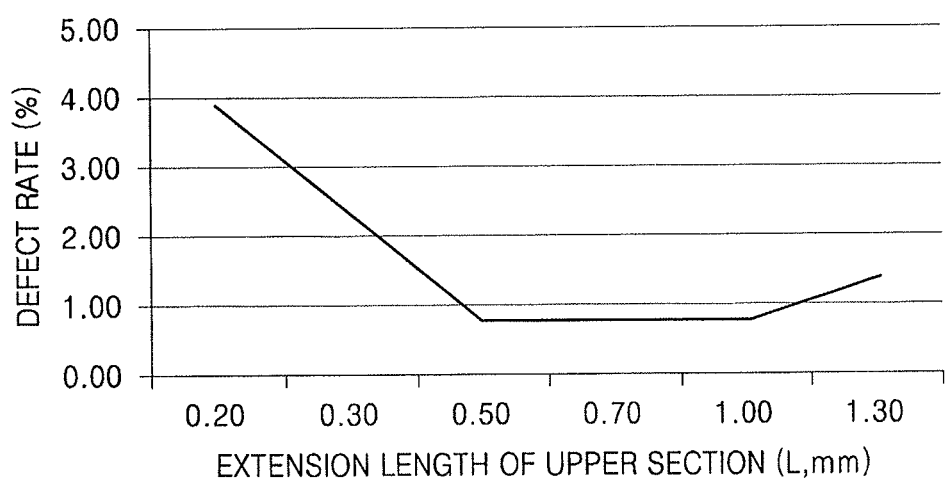
FIG. 8 illustrates a graph of a relationship between a defect rate and an extension length of an upper section, according to an exemplary embodiment.

FIG. 8 illustrates a graph of a relationship between the extension length L of the upper section 311 and a defect rate, according to an exemplary embodiment. Referring to FIG. 8, the extension length L of the upper section 311 may satisfy 0.50 mm<L<1.00 mm. When the extension length L is less than the lower limit of 0.50 mm or greater than the upper limit of 1.00 mm, the defect rate may increase.

As will be described below, the extension length L of the upper section 311 may have a co-planarity function so that the lower section 312 that is connected to the upper section 311 is closely attached to a support surface 50a, the temperature sensor 35 on the lower section 312 may not come off the support surface 50a and may be closely attached to the support surface 50a, allowing a temperature to be measured accurately. For example, the extension length L of the upper section 311 may act as a buffer length for closely attaching the lower section 312 to the support surface 50a irrespective of a welding state between the upper section 311 and the electrode pin 21.

Regarding the lower limit of 0.5 mm, when the extension length L of the upper section 311 is less than the lower limit of 0.5 mm and a part or a stepped portion of the upper section 311 that is connected to the lower section 312 may be pushed by a welding rod (not shown), the lower section 312 may come off or be deformed, and may become separated from the support surface 50a. Once the lower section 312 is separated from the support surface 50a, the temperature sensor 35 disposed on the lower section 312 may fail to be closely attached to the support surface 50a and may also be separated from the support surface 50a, and may lead to an error in measuring a temperature through the support surface 50a.

As shown in FIG. 8, when the extension length L of the upper section 311 is less than the lower limit of 0.5 mm, the defect rate may increase. For reference, in FIG. 8, the term "defect" includes a case where the temperature sensor 35 may be separated from the support surface 50a, for example, a case where, although welding may be performed correctly, a defective product may be generated during the welding.

Regarding the upper limit of 1.0 mm, when the extension length L of the upper section 311 is greater than the upper limit of 1.0 mm, co-planarity of the lower section 312 may not be maintained even in the case of a small deformation of the upper section 311 and the lower section 312 may come off or be deformed. For example, a small deformation that may occur in the upper section 311 may be amplified by the excessive extension length L of the upper section 311, and the lower section 312 may be separated from the support surface 50a.

As shown in FIG. 8, when the extension length L of the upper section 311 is greater than the upper limit of 1.0 mm, the defect rate may increase. In FIG. 8, the term "defect" also includes a case where, after welding, the temperature sensor 35 may fail to be closely attached to the support surface 50a and may come off or be separated from the support surface 50a.

Referring again to FIG. 6, the lower section 312 and the temperature sensor 35 may be in area-contact with the support surface 50a. The temperature sensor 35 may be closely attached to the support surface 50a and may accurately measure a temperature of the secondary battery. The temperature sensor 35 may precisely detect a temperature of the secondary battery through the lower section 312 that is closely attached to the support surface 50a.

The temperature sensor 35 may include the main body 35c that is closely attached to the support surface 50a and the first lead 35a at an upper position from support surface 50a in a stepwise manner, e.g., the first lead 35a may be spaced apart from the support surface 50a. The lower section 312 may be between the first lead 35a and the support surface 50a.

The temperature sensor 35 may include the second lead 35b opposite the first lead 35a at the upper position from the support surface 50a in a stepwise manner, e.g., the second lead 35b may be spaced apart from the support surface 50a. The second lead tab 32, for example, the first portion 32a of the second lead tab 32, may be between the second lead 35b and the support surface 50a. For example, the second lead tab 32 may be formed to have a flat shape having no stepped portion, unlike the first lead tab 31. The temperature sensor 35 and the second lead tab 32, for example, the first portion 32a of the second lead tab 32, may be in area-contact with the support surface 50a. The temperature sensor 35 may precisely detect a temperature of the secondary device through the second lead tab 32 that is closely attached to the support surface 50a.

The temperature sensor 35, and the first and second lead tabs 31 and 32 that are coupled to the temperature sensor 35, may contact the support surface 50a. The support surface 50a may be a top surface of the insulating member 50 that is attached to the cap plate 20. The insulating member 50 that is disposed between the cap plate 20 and the first and second lead tabs 31 and 32 may prevent an electrical short-circuit between the cap plate 20 and the first and second lead tabs 31 and 32.

According to an exemplary embodiment, a design specification for preventing a defective product which may be caused by welding between a lead tab and an electrode is provided.

According to an exemplary embodiment, precision of measurement may be improved by providing a structure and a design specification for enabling a temperature sensor to be closely mounted on a bare cell.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A secondary battery, comprising:
   an electrode assembly inside a can;
   a cap plate that seals the electrode assembly inside the can;
   an electrode pin electrically connected to the electrode assembly, the electrode pin being on the cap plate outside the can, with an insulating gasket between the electrode pin and the cap plate, a portion of the insulating gasket surrounding the electrode pin on the cap plate; and
   a first lead tab coupled to the electrode pin, the first lead tab including an upper section directly coupled to the electrode pin and extending in a first direction beyond the insulating gasket, and a lower section extending downward from an end of the upper section toward the cap plate in a stepwise manner,
   an extension length L from the insulating gasket to the end of the upper section satisfying
   0.50 mm<L<1.00 mm.

2. The secondary battery as claimed in claim 1, wherein:
   a relative ratio W2/W1 of a width W2 of the insulating gasket to a width W1 of the first lead tab satisfying
   1.0<W2/W1<1.14.

3. The secondary battery as claimed in claim 1, wherein the end of the upper section of the first lead tab corresponds to an inflection point where the upper section begins to be bent toward the lower section of the first lead tab.

4. The secondary battery as claimed in claim 1, wherein the lower section of the first lead tab is electrically connected to a temperature sensor.

5. The secondary battery as claimed in claim 4, wherein the lower section of the first lead tab and the temperature sensor are in area-contact with a support surface.

6. The secondary battery as claimed in claim 5, wherein the support surface is a top surface of an insulating member attached to the cap plate.

7. The secondary battery as claimed in claim 5, wherein:
the temperature sensor includes a first lead spaced apart from the support surface, and
the lower section of the first lead tab is between the first lead and the support surface.

8. The secondary battery as claimed in claim 7, wherein:
the temperature sensor includes a second lead opposite the first lead and spaced apart from the support surface, and
a second lead tab is between the second lead and the support surface.

9. The secondary battery as claimed in claim 8, wherein the temperature sensor and the second lead tab are in area-contact with the support surface.

10. The secondary battery as claimed in claim 9, wherein the support surface is a top surface of an insulating member attached to the cap plate.

\* \* \* \* \*